US005859762A

United States Patent [19]
Clark et al.

[11] Patent Number: 5,859,762
[45] Date of Patent: Jan. 12, 1999

[54] DOCKING STATION FOR PORTABLE COMPUTERS

[75] Inventors: David Lee Clark, Binghamton; Charles William Hall; Julian Dominick Rizzi, both of Endicott; Edward Richard Ritinski, Binghamton; John Arthur Stubecki, Nichols, all of N.Y.

[73] Assignee: International Business Machines Corporation, Armonk, N.Y.

[21] Appl. No.: 645,461

[22] Filed: May 13, 1996

[51] Int. Cl.$^6$ ...................................... H05K 7/20
[52] U.S. Cl. ...................... 361/686; 248/918; 248/124.1; 248/122.1; 248/346.01
[58] Field of Search .................... 248/918, 346, 248/499, 510, 289.1, 296, 278, 279, 454; 297/468; 224/42.45 R; 312/235 A; 108/44, 139, 103; 361/686, 687

[56] References Cited

U.S. PATENT DOCUMENTS

| | | | |
|---|---|---|---|
| D. 361,987 | 9/1995 | Yamazaki | D14/107 |
| 4,345,147 | 8/1982 | Aaron et al. | 235/385 |
| 4,733,838 | 3/1988 | van der Lely | 248/124 |
| 4,854,538 | 8/1989 | Von Schalscha | 248/346 |
| 4,946,120 | 8/1990 | Hatcher | 248/183 |
| 5,177,665 | 1/1993 | Frank et al. | 361/380 |
| 5,290,178 | 3/1994 | Ma | 439/652 |
| 5,359,349 | 10/1994 | Jambor et al. | 345/168 |
| 5,402,310 | 3/1995 | Penniman | 361/686 |
| 5,408,382 | 4/1995 | Schultz et al. | 361/686 |
| 5,436,792 | 7/1995 | Leman et al. | 361/686 |
| 5,450,271 | 9/1995 | Fukushima et al. | 361/686 |
| 5,460,547 | 10/1995 | Belt et al. | 439/638 |
| 5,555,491 | 9/1996 | Tao | 361/686 |
| 5,564,668 | 10/1996 | Crowe, II | 248/918 X |
| 5,642,625 | 7/1997 | Cates, Jr. et al. | 62/55.5 |
| 5,751,548 | 5/1998 | Hall et al. | 361/686 |

FOREIGN PATENT DOCUMENTS 7277697  10/1995  Japan .

*Primary Examiner*—Ramon O. Ramirez
*Assistant Examiner*—Long Dinh Phan
*Attorney, Agent, or Firm*—Scully, Scott, Murphy & Presser; Lawrence R. Fraley, Esq.

[57] ABSTRACT

A portable computer holder is adjustably mounted on a base portion that is attachable to the floor of a vehicle and is provided with a means for heating the portable computer when the computer is positioned in the holder. The heated holder effectively solves the problem of maintaining a portable computer at an operable temperature in cold environments.

9 Claims, 7 Drawing Sheets

DOCKING STATION FOR PORTABLE COMPUTERS

BACKGROUND OF THE INVENTION

1. Technical Field

This invention relates generally to a docking station for laptop computers, and more particularly to a docking station adapted for installation in a vehicle.

2. Background Art

The compact size, light weight, and self contained power features of laptop computers make them particularly suitable for use in vehicles, such as cars, trucks, and locomotives. Several arrangemnts have been proposed for mounting small portable computers in automobiles or vehicles. For example, U.S. Pat. No. 4,854,538 issued Aug. 8, 1989 to Craig Von Schalscha describes a device for mounting a personal computer in a motor vehicle having an elevated tunnel. In another mounting arrangement, a support for securing a laptop computer to a car seat is described in U.S. Pat. No. 4,946,120 issued Aug. 7, 1990 to David O. Hatcher. In yet another arrangement, described in U.S. Pat. No. 5,177,665, issued Jan. 5, 1993 to Michael J. Frank, et al, a mounting assembly for a small portable computer has a housing adapted for attachment to the steering wheel of a vehicle. All of these arrangements restrict the use or operation of the computer to a particular position within the vehicle, and restrict operation of the vehicle and deployment of air bags during use of the portable computer.

Another problem encountered in the use of portable computers in vehicles, particularly in cold climates, is the reduced definition, or contrast, on LCD screens typically used in laptop computers. This characteristic is especially noticeable during wintertime operation, after the computer has been stored in the vehicle overnight, for example in police or emergency vehicles. Typically it takes several minutes for the vehicle engine to warm up, then warm the vehicle interior, and finally heat the computer to a suitable operating temperature.

The present invention is directed to overcoming the problems set forth above. It is desirable to have a docking station for portable computers that will support the computer within a vehicle and can be rotated to a number of different positions so that the computer can be used, or viewed, by an occupant of a motor vehicle. It is also desirable to have a docking station that can be mounted in a vehicle at a position that does not interfere with vehicle controls or air bag deployment. It is also desirable to have a means for maintaining the computer at a predetermined temperature so that the computer is instantly usable, upon demand, even in cold environments. SUMMARY OF THE INVENTION In one aspect of the present invention, a docking station for a portable computer includes a base portion and a holder attached to the base portion and adapted for holding and supporting the portable computer at a plurality of preselected positions. The docking station also includes a means for heating the computer.

Other features of the docking station embodying the present invention include the holder having a size sufficient to enclose a port replicator attached to the portable computer. Still other features of the docking station embodying the present invention include means for selectively maintaining the holder at a predetermined radial position with respect to a base portion support column, and a means for maintaining the screen support portion of the holder at an open position with respect to the keyboard portion.

DETAILED DESCRIPTION OF A PRESENTLY PREFERRED EXEMPLARY EMBODIMENT

Figure 2:
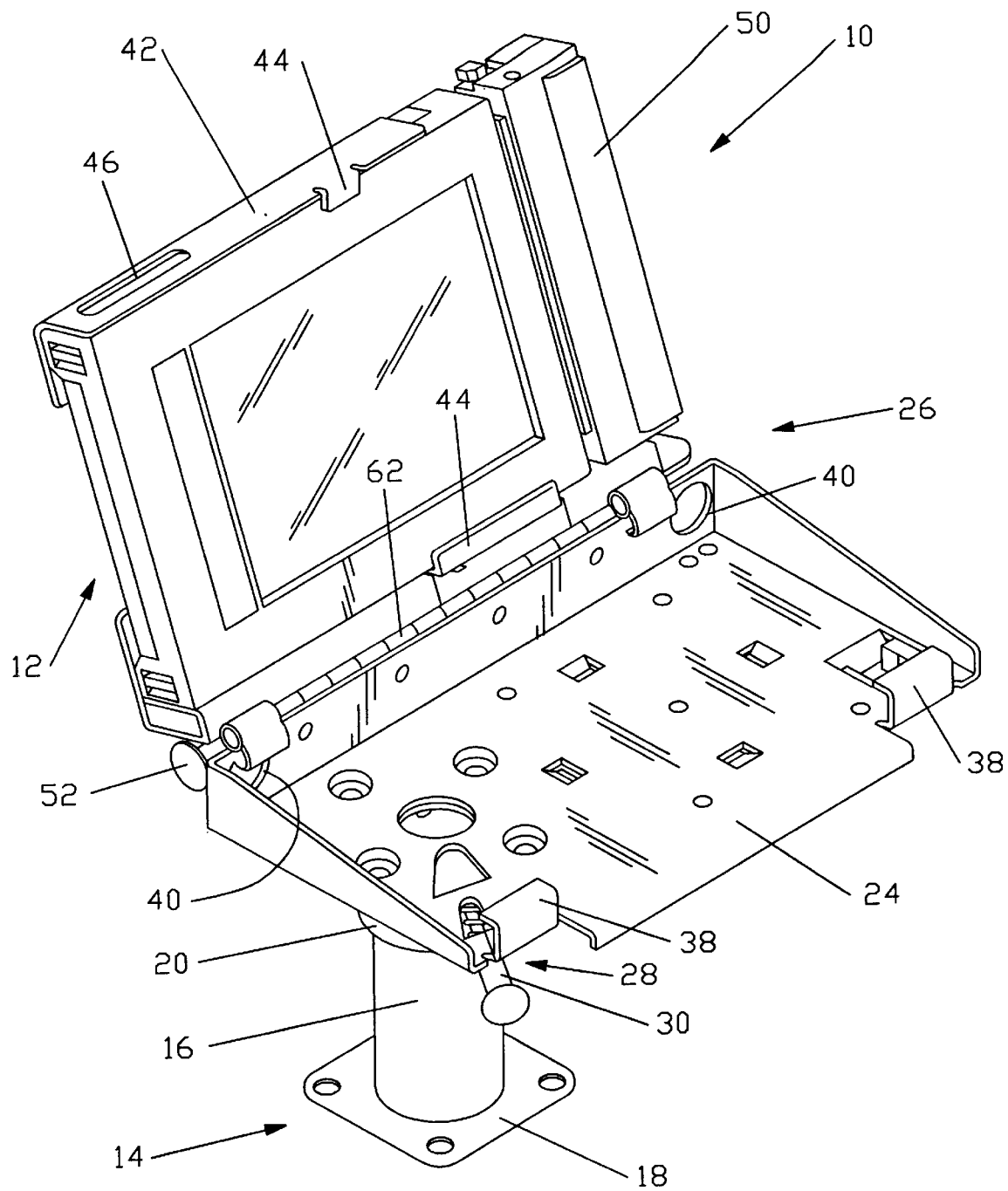
FIG. 2 is a three-dimensional view of the docking station embodying the present invention with the keyboard and pen associated with the portable computer removed.
Figure 4:
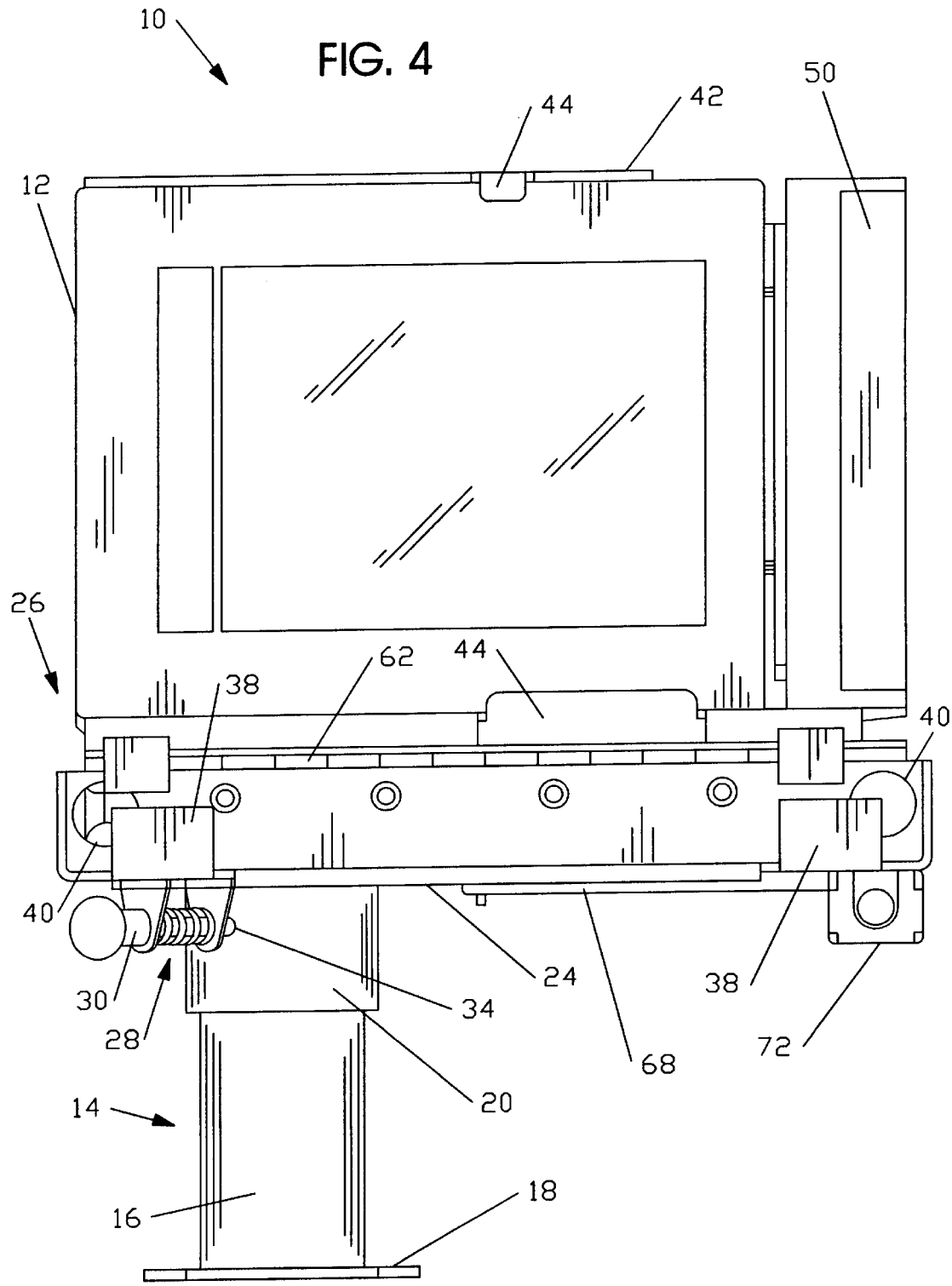
FIG. 4 is a front view of the docking station embodying the present invention.

A docking station, suitable for use for protectively supporting a portable computer during use in a vehicle, is generally indicated in the drawings by the reference numeral 10. In the preferred embodiment of the present invention, the docking station 10 is adapted to protectively enclose and support an IBM Thinkpad™ Model 730T or 730TE portable computer. The IBM Thinlkpad™ 730 series portable computer is a pen based computer that includes an integral display screen 12, a pen 13 capable of inputting "written" messages and characters on the display screen 12, a Personal Computer Memory Card International Association (PCMCIA) slot 46 and port for connection with other peripheral equipment such as a printer, and a keyboard port for adding a keyboard 11. A port replicator 50 is also provided as a standard component, enabling the computer to be readily connected to the peripheral components and an external power supply. While the following description of the preferred embodiment is described in conjunction with use of IBM Thinkpad™ 730T/730TE computers, the docking station can be easily reconfigured to accept other laptop computers, notebook computers, personal notepads, and the like. For better clarity and understanding of the holder portion of the docking station 10, only the computer and associated display screen 12 is shown in FIGS. 2 and 4, and omitted in its entirety from the other Figures.

The docking station 10 embodying the present invention has a base portion 14 that, in the illustrative embodiment, is adapted for mounting to the floor or other interior surface of a vehicle, such as an automobile, truck, or locomotive. The base portion 14 has a vertical column 16 that is attached, such as by welding, to a flange 18 adapted for attachment to the floor of the vehicle. The base portion 14 also includes an upper cylindrical portion 20 adapted to slideably engage the column 16 and has an upper flange 22 that is attached to an upper end of the cylinder and adapted to mount directly to a keyboard support portion 24 of a portable computer holder 26. Preferably, the cylindrical portion 20 is vertically adjustable with respect to the column 16, such as by one or more set screws threadably mounted in the cylindrical portion 20 that are adapted to engage one of a plurality of vertically spaced apart grooves (not shown) in the upper end of the column 16.

Figure 5:
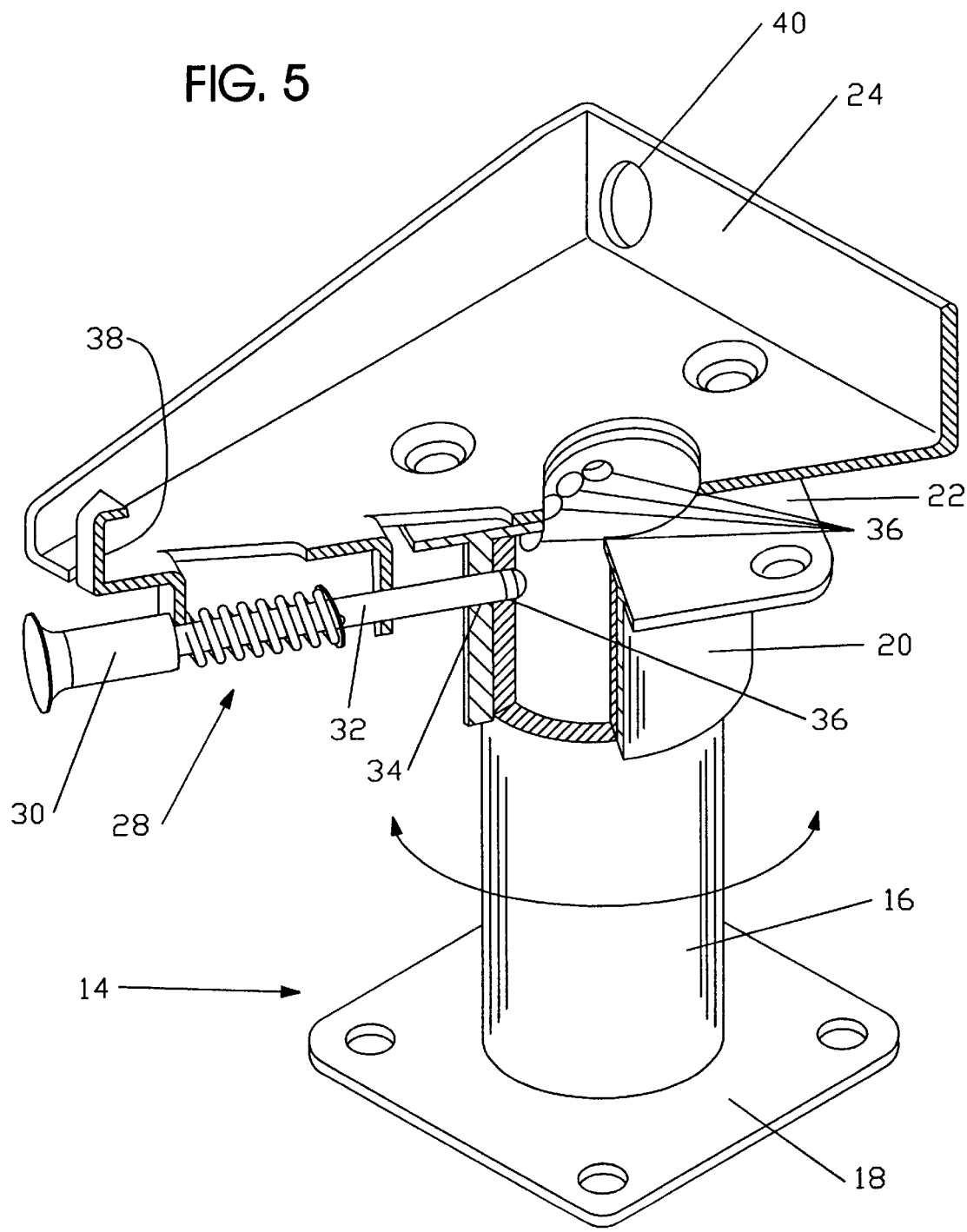
FIG. 5 is a partial three-dimensional view of the keyboard support portion of the docking station embodying the present invention with portions cut away to show details of a locking arrangement for the keyboard support portion.

As best shown In FIG. 5, the docking station 10 embodying the present invention includes a means 28 for selectively maintaining the holder 26 at a predetermined position with respect to the base portion 14. In the illustrative embodiment, the means 28 for selectively maintaining the holder 26 includes a spring-biased pin 30 mounted on a pair of flange surfaces extended downwardly from the keyboard support portion 24 of the holder 26, and has a distal end 32 that extends through a single aperture 34 in the upper cylinder 20 of the base member 14, and selectively engages one of a plurality of radially spaced apart apertures 36 defined in the column 16 of the base member 14.

Figure 1:
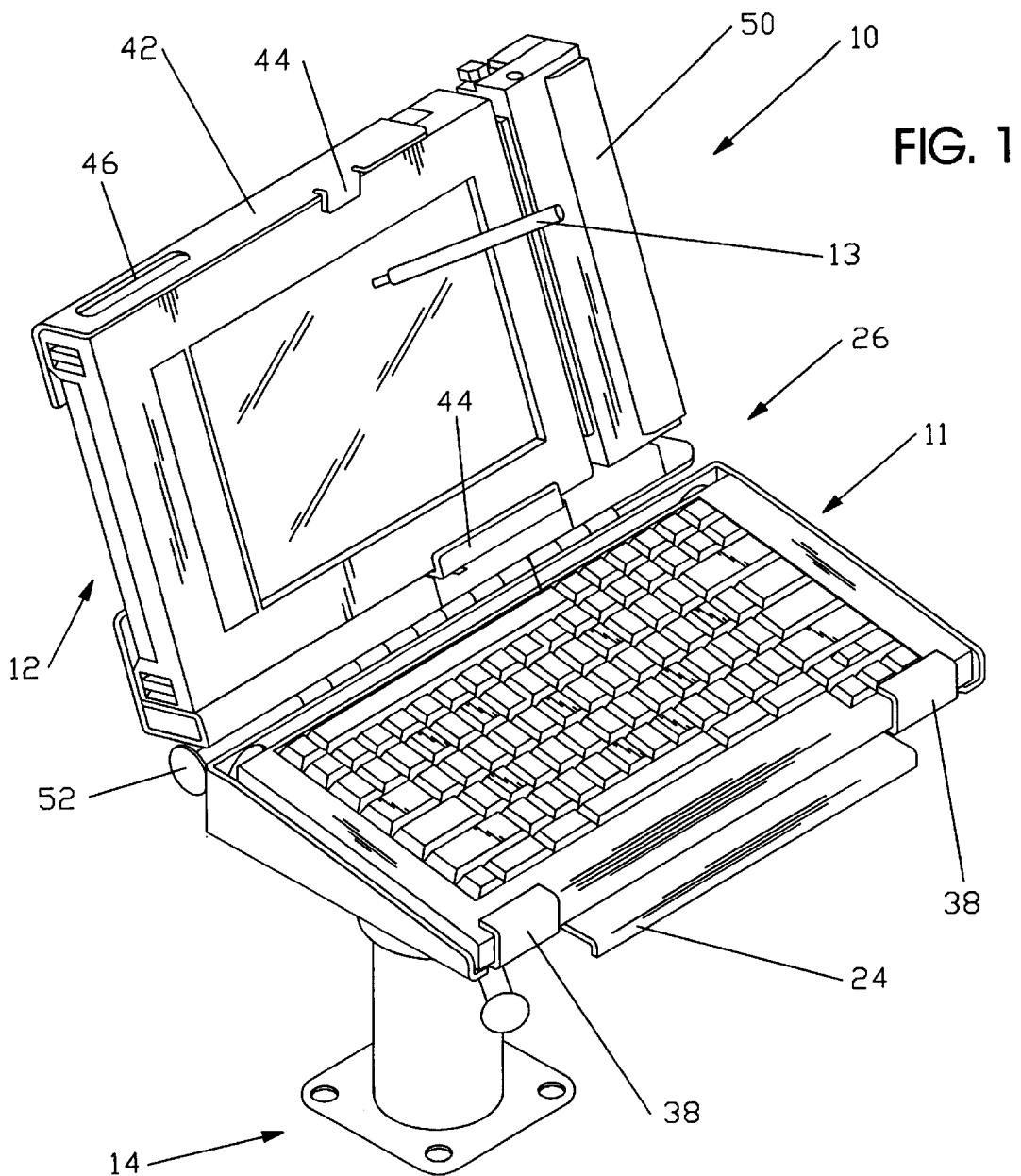
FIG. 1 three-dimensional view of the docking station embodying the present invention, showing the portable computer installed in the docking station.
Figure 3:
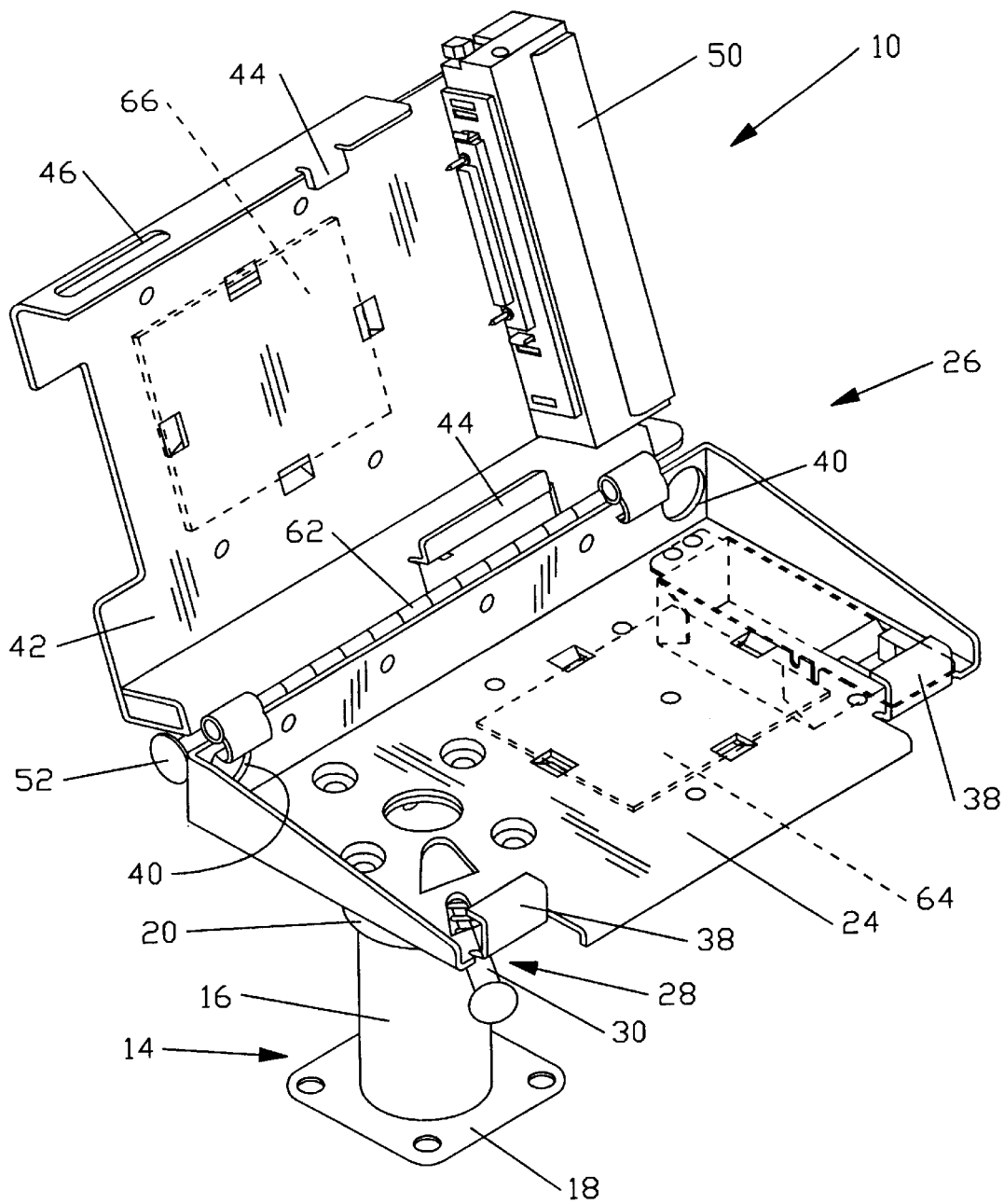
FIG. 3 is a three-dimensional view of the docking station embodying the present invention, with the portable computer removed.

The keyboard support portion 24 of the holder 26 also includes a plurality of clip elements 38 which are adapted to retain the keyboard 11 in secure engagement within the keyboard support portion 24. Other retainer arrangements, such as straps, fabric locking strips, i.e., Velco™ tape, may be used either in addition to the above-described clip elements 38, or as the sole retention members. Desirably, the keyboard support portion 24 also includes one or more apertures 40 which provide a passageway for a cable extending between the keyboard 11 and the portable computer. The portable computer holder 26 also includes a screen support portion 42. As shown in FIGS. 1, 2 and 3, the screen support portion 42 includes a pair of clips 44 that frictionally maintain the portable computer and the integral display screen 12 at a fixed position with respect to the screen support portion 42, and also includes a PCMCIA slot 46 and apertures 48 through which screws are installed to retain the port replicator 50 attached to the portable computer. When installed into the screen support portion 42 of the holder 26, the input/output ports of the computer are engaged with the port replicator 50 and the PCMCIA slot of the computer is aligned with the opening 46 so that external communication can be established with the computer.

Figure 6:
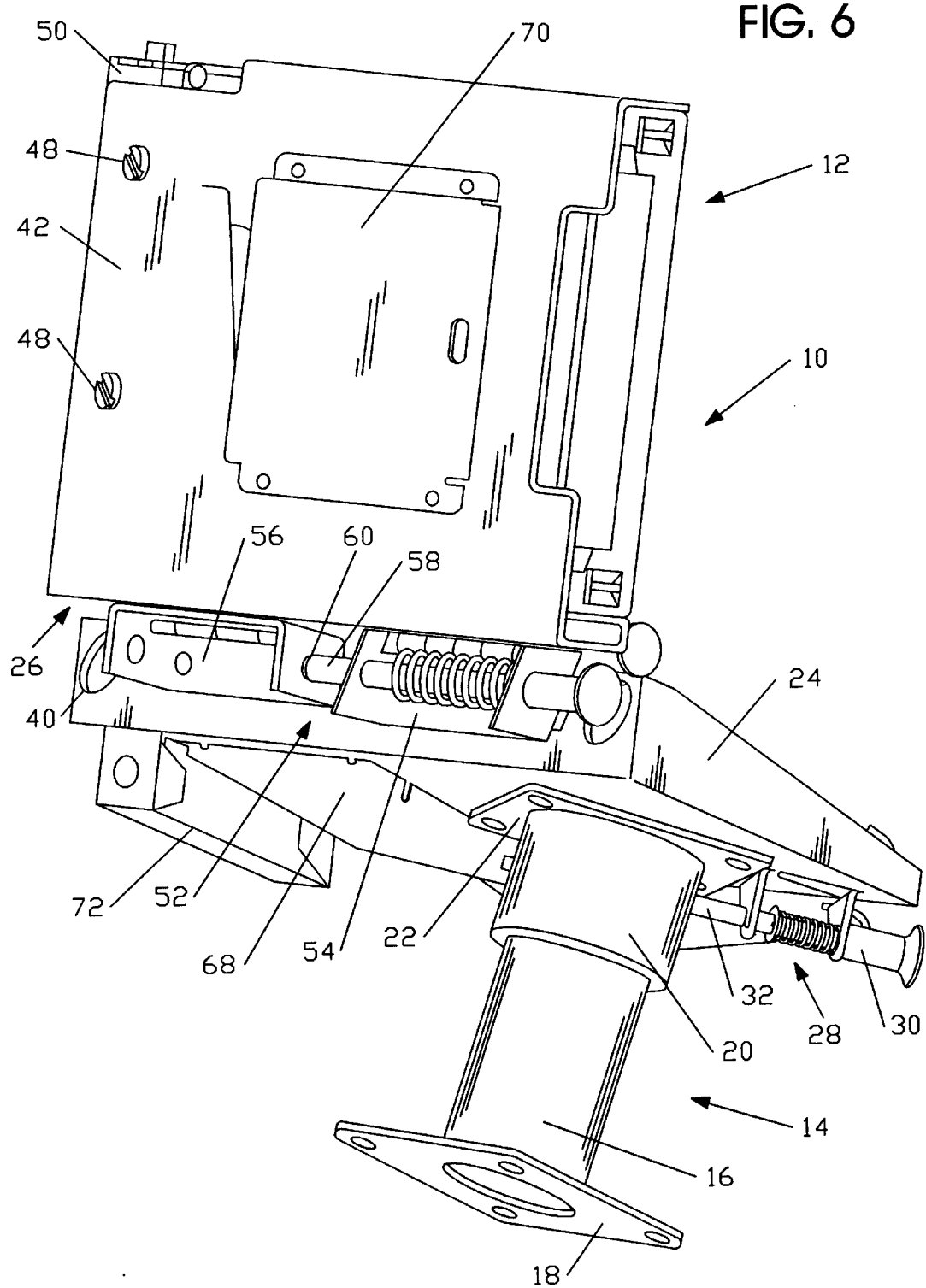
FIG. 6 is a three-dimensional rear view of the docking station embodying the present invention.

The docking station 10 also includes a means 52 for maintaining the screen support portion 42 of the holder 26 at an open position with respect to the keyboard support portion 24 of the holder 26. As shown in FIG. 6, one arrangement of the means 52 for maintaining the screen support portion 42 at an open position includes a first bracket 54 attached to the keyboard support portion 24, and a second bracket 56 attached to the screen support portion 42 of the holder 26. A spring-loaded pin 58 extends through a pair of holes provided in the bracket 54 and has a length sufficient to engage an aperture 60 provided in the bracket 56 which is aligned with the pin 58 when the screen support portion 42 is at the open position. The screen support portion 42 of the holder 26 is attached to the keyboard support portion 24 by a hinge 62, and is thus movable between a closed position at which the screen support portion 42 covers the lower keyboard support portion 24, and an open position shown in the drawings at which the screen support portion 42 is positioned at a viewing position. Although not shown, it is desirable that the screen support portion 42 be provided with a lock interconnected with the keyboard support portion 24 to provide secure storage of the portable computer when the screen support portion 42 is at the closed position.

Figure 7:
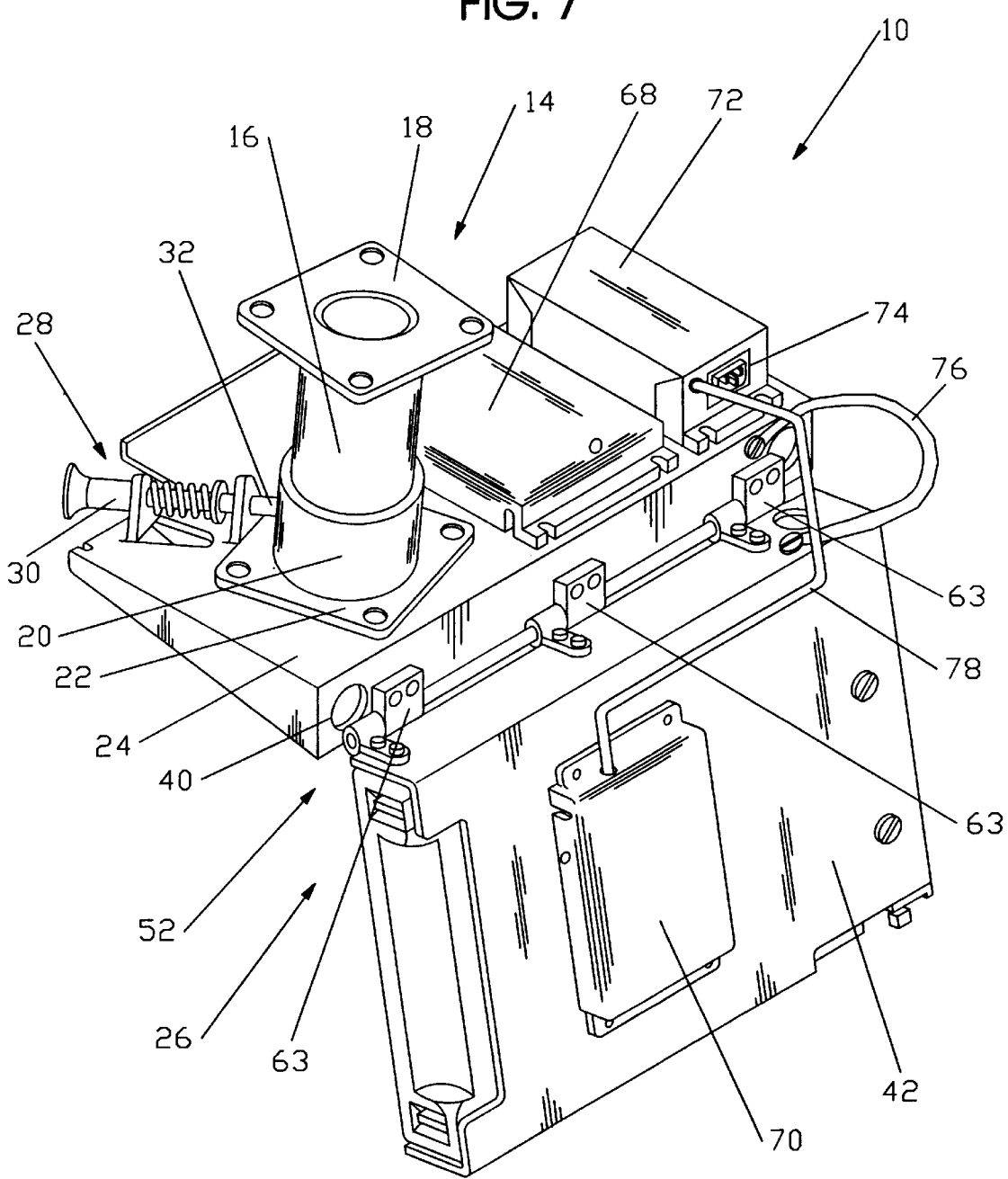
FIG. 7 is a three-dimensional rear view of the bottom and rear portions of the docking station embodying the present invention.

Alternatively, the means 52 for maintaining the screen support portion 42 of the holder 26 at an open position may comprise a plurality of position control hinges 63, as shown in FIG. 7. Position control hinges produce high frictional torque within the hinge to keep the hinge at a set position. One example of such position control hinges, known as Smooth Touch™ hinges, are available from CEMA Technologies, Inc., Bridgeport, Pa. Other devices suitable for use in maintaining the screen support portion 42 of the holder 26 at an open position include spring loaded detent hinges and locking support arm arrangements.

Importantly, the docking station 10 embodying the present invention includes a means for heating the portable computer when the computer is positioned in the holder 26. In the preferred embodiment, the means for heating the portable computer includes a first heating element 64 detachably mounted on the keyboard support portion 24, and a second heating element 66 detachably mounted on the screen support portion 42 of the holder 26. Preferably, the first heating element 64 and the second heating element 66 are thin, flexible resistance heating pads that are positioned within clips provided in the outer surface of the respective support portions 24, 42, and are maintained in pressure contact with the respective outer surfaces by a pair of plates 68, 70 that are also received within the clips. Suitable flat, thin, coiled heaters embedded in a silicone rubber matrix are commercially available from Omega Corporation.

Each of the heating elements 64, 66 are electrically connected to a 110 volt supply through a junction box 72 positioned on the bottom surface of the keyboard support portion 24. Desirably, a thermostat, in contact with the bottom surface of the keyboard support portion 24, is positioned within the junction box and serves as a temperature controller for the heating elements 64, 66. Typically, the thermostat is preset to maintain the surface temperature of the keyboard support portion 24 at a temperature above about 32° F. The upper limit of the thermostat is preset to discontinue heating when the surface temperature exceeds about 110° F. Preferably, the keyboard support portion 24 and the screen support portion 42 of the holder 26 are formed of a material having good thermal conductance properties, such as cold rolled steel or aluminum. Desirably, the material forming the keyboard support portion 24 and the screen support portion 42 has a thermal conductivity of at least about 9.4 Btu·ft/hr·ft$^2$·F. (16.3 W/m·K), which is the thermal conductivity of standard austenitic grade wrought stainless steel. Preferably the heating elements 64, 66 are powered by an external source, such as standard 110 volt line current, to avoid drain on a vehicular or auxiliary battery source. This is especially important if heating is to be provided over considerable length of time, for example, overnight.

A socket receptacle 74 is provided on the junction box 72 to provide interconnection with a suitable power source, such as a 110 volt electrical circuit. A ground wire 76 is connected between the screen support portion 42 and the keyboard support portion 24 of the holder 26 to provide a mutual electrical grounding of the respective support portions 42,24. An electrical lead 78 provides power from the junction box 72 to the second heating element 66 in the screen support portion 42, and a similar electrical lead, not shown, provides power to the first heating element 64 in the keyboard support portion 24 of the holder 26.

Thus, it can be seen that the docking station 10 embodying the present invention provides a convenient protective holder 26 for a portable computer. The holder 26 can be rotatably positioned at a number of preselected radial positions with respect to the column 16 of the base portion 14. Furthermore, the base portion 14 can be conveniently mounted on a vehicle at a position that does not interfere with the deployment of safety airbags, nor with the operation of the vehicle, nor with vehicle controls, for example, heating and air conditioning controls and vents. The screen support portion 42 of the holder 26 can locked in place at a predetermined open position with respect to the keyboard of the computer. The docking station 10, embodying the present invention, also provides a method of keeping the keyboard, screen and hardware components of the computer at a minimum operating temperature irrespective of the temperature of the environment surrounding the computer. The heating elements 64, 66 enable the computer to be readily available during cold weather when the vehicle is not in operation, and will maintain the ambient temperature surrounding the computer at a temperature above 32° F. when the outside temperature goes much lower, for example, minus 30° F.

Although the present invention is described in terms of a preferred exemplary embodiment, those skilled in the art will recognize that changes in heating element design, retention clip arrangement for maintaining the screen in the screen support portion 42 and the computer keyboard in the keyboard support portion 24 of the holder 26, and base member construction can be made, consistent with the specifically stated required functional characteristics, without departing from the spirit of the invention. Likewise, the location of the port replicator 50 may be positioned at a location other than that shown and illustrated in the drawings. For example, the replicator may be positioned in the rear or at one side of the keyboard support portion 24 if the portable computer is provided with input/output ports or other interface ports in the keyboard portion of the computer. Such changes are intended to fall within the scope of the following claims. Other aspects, features and advantages of the present invention can be obtained from a study of this disclosure and drawings, along with the appended claims.

What is claimed is:

1. A docking station for a portable computer having a viewable screen unit operably interconnected with a keyboard unit, said docking station comprising:

a base portion;

a holder coupled to said base portion and adapted for holding said portable computer, said holder comprising a keyboard support portion adapted to support the keyboard unit of said portable computer, and a screen support portion adapted to support said viewable screen unit of the portable computer, said screen support portion being pivotably connected to said keyboard support portion, a means for heating said portable computer when said portable computer is positioned in said holder, said means for heating the portable computer including a first heating element mounted on said keyboard support portion and a second heating element mounted on said screen support portion.

2. A docking station, as set forth in claim 1, wherein said means for heating the portable computer includes a resistance heating element mounted on said holder.

3. A docking station, as set forth in claim 1, wherein said first and second heating elements have a thin pad construction with heating elements disposed therein.

4. A docking station, as set forth in claim 1, wherein said holder has a size sufficient to enclose a port replicator attached to said portable computer.

5. A docking station, as set forth in claim 1, wherein said base portion has a longitudinal column and said holder is rotatably mounted on said column and movable between predefined radial positions spaced about said column.

6. A docking station, as set forth in claim 5, wherein said holder includes a means for selectively maintaining said holder at a predetermined radial position with respect to said base portion.

7. A docking station, as set forth in claim 1, wherein said screen support portion is movable between open and closed positions with respect to the keyboard support portion, and said docking station includes means for maintaining said screen support portion at said open position.

8. A docking station, as set forth in claim 1, wherein said holder is formed of a material having a thermal conductivity of at least about 9.4 Btu·ft/hr·ft$^2$·F. (16.3 Wm·K).

9. A docking station, as set forth in claim 1:

wherein said base portion is adapted to adjustably support said holder and is attachable to an interior surface of a vehicle.

* * * * *